March 9, 1926.　　　　　　　　　　　　　　　　1,575,735
E. P. BURRELL ET AL
WAY GUARD FOR MACHINE TOOLS
Filed March 26, 1924　　　5 Sheets-Sheet 4

March 9, 1926.

E. P. BURRELL ET AL

WAY GUARD FOR MACHINE TOOLS

Filed March 26, 1924    5 Sheets-Sheet 5

1,575,735

Patented Mar. 9, 1926.

1,575,735

UNITED STATES PATENT OFFICE.

EDWARD P. BURRELL, OF SHAKER HEIGHTS, AND JOHN J. N. VAN HAMERSVELD, OF CLEVELAND, OHIO, ASSIGNORS TO THE WARNER AND SWASEY COMPANY, OF CLEVELAND, OHIO, A CORPORATION OF OHIO.

WAY GUARD FOR MACHINE TOOLS.

Application filed March 26, 1924. Serial No. 701,909.

*To all whom it may concern:*

Be it known that we, EDWARD P. BURRELL and JOHN J. N. VAN HAMERSVELD, citizens of the United States, and residents, respectively, of Shaker Heights, in the county of Cuyahoga and State of Ohio, and Cleveland, in the county of Cuyahoga and State of Ohio, have invented a certain new and useful Improvement in Way Guards for Machine Tools, of which the following is a full, clear, and exact description.

This invention relates to way guards for machine tools, and has particular reference to machine tools having two or more sliding members with at least one common way for such members.

It is a well-known fact that in many kinds of machine tools, such as lathes, grinding machines, and the like, chips, dirt and dust lodge on the ways, and by mixing with the lubricant of the ways form an abrasive compound which causes very serious wear on the working or contacting surfaces of the ways and sliding members, requiring that the contact surfaces, particularly of the ways be planed off from time to time, or otherwise re-machined to remove the effects of the wear. This is not only expensive and reduces the life of the machine, but it results in an economic loss due to the fact that the machine is of necessity out of commission while thus being repaired. Furthermore, a re-machining of the surfaces requires a re-alignment of the sliding bodies with relation to the work holding spindle. In fact, the difficulties of restoring the machine to a proper working condition after it has been adversely affected by wear for the reasons stated, are so great that it is often necessary that the machines be shipped to the factories where they were originally constructed, and this of necessity deprives the owners of their use for a considerable period of time, as well as entailing a great deal of expense.

The principal object of the invention is to provide practical means for guarding and protecting the working surfaces of the ways of a machine tool, wherein one or more of the ways are common to two or more sliding members, so as to extend the life of tools of this kind and to adequately protect the working surfaces of the ways from the chips, dirt and dust, and from being injured by wrenches or heavy work pieces being placed upon, or accidentally dropped on the ways, as they are at times, if left unprotected.

The above objects are attained by the present invention, which may be here briefly summarized as consisting in certain novel details of construction, and combinations and arrangements of parts which will be described in the specification and set forth in the appended claims.

Our invention may be applied advantageously to many kinds of machine tools such as both metal and wood working machines, including metal and wood working lathes, grinding machines and the like, but in the drawings we have illustrated our invention as applied to a turret lathe, without, however, limiting the invention to a machine tool of this type.

In the accompanying sheets of drawings, Fig. 7 is a transverse sectional view of the way illustrated at the left hand side of Fig. 5, showing a slight modification.

Referring now to the drawings, and first to sheets 1, 2 and 3 thereof, 10 represents the lathe bed, 11 the head having a spindle carrying, in this instance, a chuck 12. Additionally 13 represents a turret saddle carrying a turret 14, and 15 represents a cross slide carriage carrying a cross slide 16.

Figure 1:
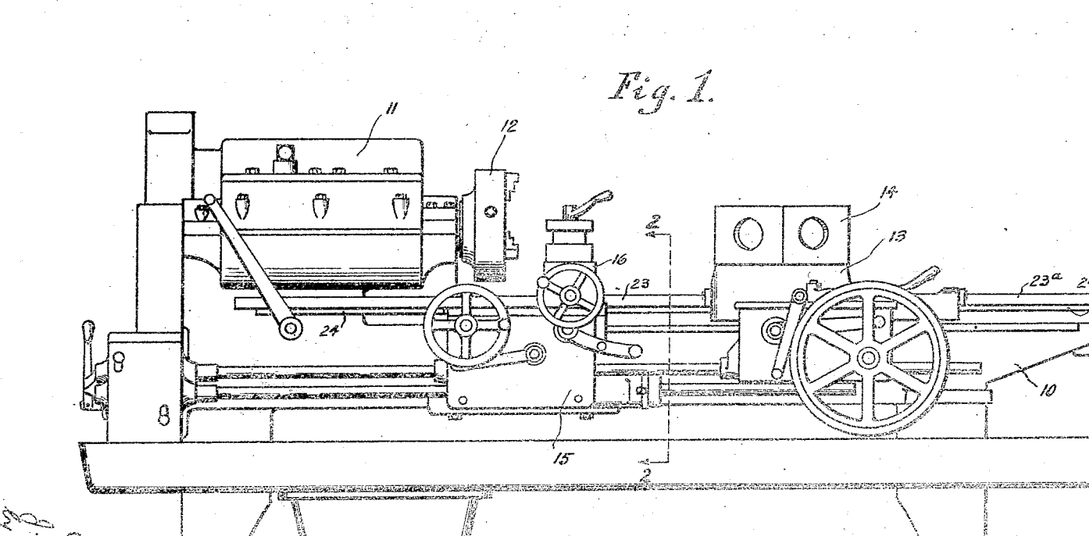
Fig. 1 is a side view of a turret lathe constructed in accordance with, or embodying our invention.
Figures 1, 2:
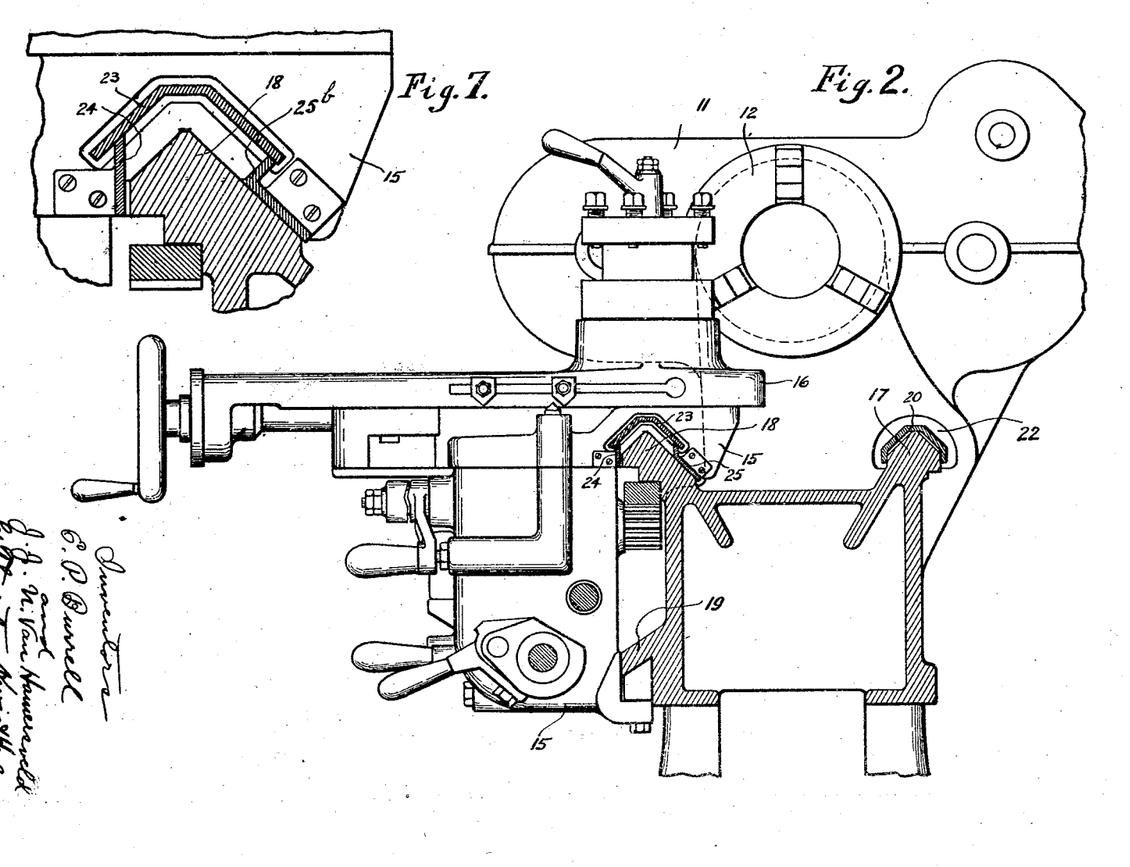
Fig. 2 is a transverse sectional view of the same substantially along the line 2—2 looking in the direction indicated by the arrows.
Figure 3:
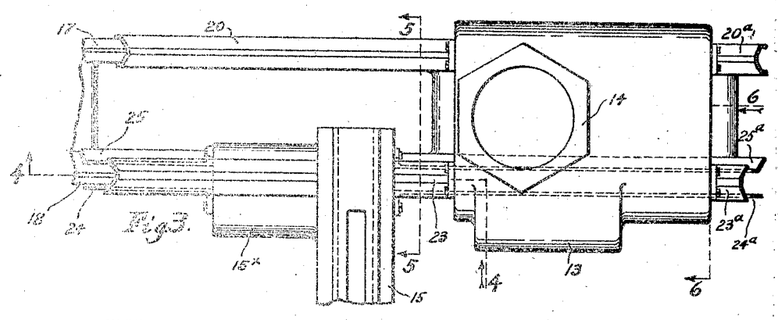
Fig. 3 is a plan view omitting the head and showing the cross slide carriage and the turret saddle with the various operating parts omitted.

All the parts mentioned may be of the usual, or any construction, as the details of these parts including the mechanisms or devices for operating or shifting them form no part of the present invention, and these parts may be constructed as illustrated, or otherwise if desired. Therefore, it is not regarded as necessary to describe in detail the operating parts illustrated in Figs. 1 and 2.

For supporting the turret saddle and cross slide carriage, the bed may be provided with three ways, 17, 18 and 19 as in the construction illustrated in sheets 1 to 4. The turret saddle in this instance travels over the ways 17 and 18, which are parallel to each other and arranged at the top of the bed, the way 17 being a rear way and the way 18 being a front or forward way, and the cross slide carriage is supported on the upper front way 18 and the lower front way 19. Therefore with this construction the upper front way 18 is common to both the turret saddle and cross slide carriage, and it is particularly in the guarding of this common way 18 that the invention resides.

A suitable guard for the rear way 17 presents no serious problem since this way is traversed by one slide only, hence we are enabled to adequately guard this way by attaching to the front of the turret saddle a forwardly projecting way guard 20 and to the rear end of the turret saddle a rearwardly projecting way guard 20ª of the desired lengths. These guards consist simply of inverted U or V shaped members which fit over the working surfaces of the way 17 and have suitable supporting and sliding contact therewith. To enable the turret saddle to be brought up close to the head, if desired, the latter is provided with a clearance opening 22 (see Fig. 2) for the forwardly projecting way guard 20.

For the purpose of guarding the front way 18, which as previously stated, is common to, or is traversed both by the turret saddle and cross slide carriage, in accordance with the present invention there is provided what might be termed a composite guard composed of telescopic or relatively slidable members, part in supporting relation to the other, and part carried by the turret saddle and part by the cross slide carriage, these members by their co-operative relation forming a complete housing for the way 18, similar in function or effect to the one-piece way guard 20 or 20ª.

In the preferred form of the invention, the guard for the way 18, both forwardly of and rearwardly of the turret saddle consists of three members including a top guard member and two lower guard members, the former being attached to the turret saddle, and the latter to the cross slide carriage. In the construction illustrated, the upper guard member 23 is attached to the front end of the turret saddle so as to project forwardly from the turret saddle over the way 18 through and beyond the cross slide carriage, and to the rear end of the turret saddle there is attached a similar upper guard member 23ª, this projecting rearwardly of the turret saddle over the way 18. To the front side of the cross slide carriage, and in this instance, to a lateral extension 15ˣ thereof, there are attached two lower guard members 24 and 25 which project forwardly from the cross slide carriage over or along the way 18 beneath the upper guard member 23 attached to the turret saddle. In a similar fashion there is attached to the rear side of the cross slide carriage, similar lower guard members 24ª and 25ª, these members projecting through the turret saddle 13 over or along the way 18 beneath the upper guard members 23 and 23ª attached to the turret saddle, as explained. All the before mentioned guard members 20, 20ª, 23, 23ª, 24, 24ª, 25 and 25ª may be attached in any suitable fashion to the turret saddle or cross slide carriage, as by means of screws 26 passing through ears or angularly bent ends of the guard members, as clearly illustrated in the drawings.

As herein illustrated, the upper guard members 23 and 23ª extend over and guard the top portion of the way 18, and in this case these guard members are substantially in the form of an inverted U or V, but this particular shape is unnecessary, and these guard members may be otherwise shaped, as will be explained.

The forwardly projecting upper guard member 23 attached to the turret saddle passes through a cored opening 27 (see Figs. 4 and 5) in the upper portion of the cross slide carriage. This opening provides clearance between this upper guard member and the cross slide carriage, and has a shape corresponding to the shape of the guard member. This guard member 23 and the opening 27 in the cross slide carriage are, as clearly illustrated in Fig. 5, above the way 18, so that beneath this opening the material or body of this cross slide carriage is left unbroken to form the supporting portion of the cross slide carriage designed to rest upon the way, precisely the same as if the opening 27 were not provided.

The two guard members 24 and 25 and $24^a$ and $25^a$ are on opposite sides of the top portion of the way 18 and they bridge or close the space between the upper guard members 23 and $23^a$ and the way. Likewise, additionally, the guard members 23 and $23^a$ at or near their longitudinal edges rest upon and have sliding contact with the top edges of the guard members 24 and 25 and $24^a$ and $25^a$ so that the upper guard members 23 and $23^a$ are thus adequately supported. The guard members 24 and 25 and $24^a$ and $25^a$ are upright members, or have upright portions which in the preferred embodiment are parallel to each other, and it is on the top edges of these upright portions that the upper guard members rest, the latter, preferably overhanging the upright portions of the lower guard members, as illustrated, to better exclude dirt, dust, and particularly to prevent the cutting compound getting inside the guard members, and therefore on the working surfaces of the way and the members which slide thereon.

While these upright portions of the lower guard members are in the preferred form of the invention parallel to each other, as above stated, one or both of the lower guard members may extend outwardly to and at right angles to the upper guard member, as illustrated in Fig. 7, where this slight modification is applied to the inside lower guard member, here designated $25^b$.

Figures 5, 6:
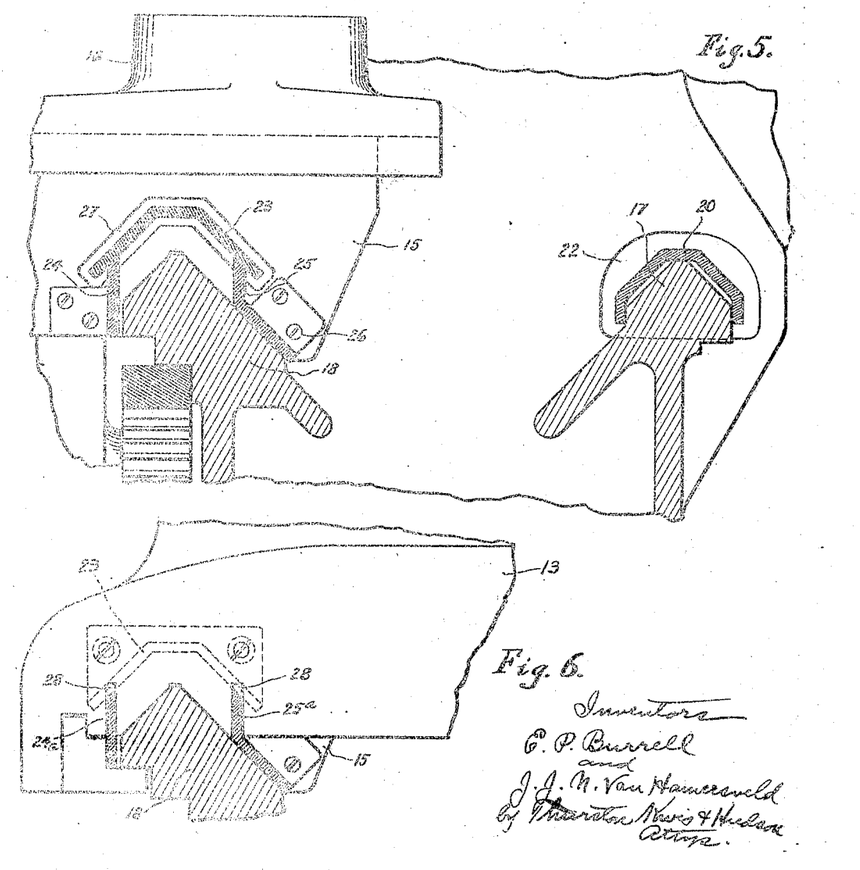
Fig. 5 is a transverse sectional view on an enlarged scale, showing particularly the ways and way guards and omitting some of the parts shown in Fig. 2, this section being taken substantially along the line 5—5 of Fig. 3.
Fig. 6 is a transverse sectional view substantially along the line 6—6 of Fig. 3, looking in the direction indicated by the arrows.

The rearwardly projecting lower guard members 24 and 25 pass through slots in the turret saddle which are indicated at 28 in Fig. 6 so as to avoid interference between the cross slide carriage and its associated guard members, and the turret saddle, and in this respect these slots perform the same function as the cored opening 27 which accommodates the upper guard member 23 projecting forwardly from the turret saddle. Additionally, however, these slots which have a width so that the guard members will have a close working fit therein, act as guides to hold the guard members the right distance apart. Thus the cross slide carriage and turret saddle may be brought close to each other without any possible interference by reason of the guard members which they carry.

Additionally, clearance is provided between the forwardly projecting guard members 23, 24 and 25 and the head 11, and this may be accomplished as in this instance by so shaping the head that the guard members may pass freely alongside of it, or if in any machine this is not possible or desirable, they may, to provide the necessary clearance, extend through or into an opening of the head such as the opening 22 provided for the guard over the rear way 17.

Figure 4:
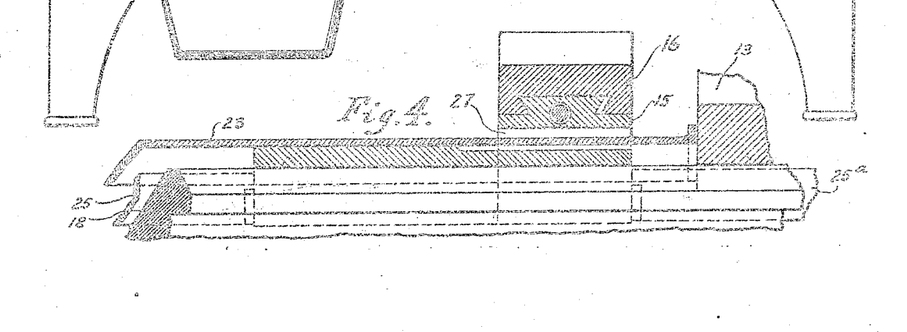
Fig. 4 is a sectional view slightly enlarged, the section being taken substantially along the line 4—4 of Fig. 3, looking in the direction indicated by the arrows.

It will be noted, particularly by reference to Fig. 4, that the cored opening 27 extends through the upper portion of the cross slide carriage, and not through the extension $15^x$. Likewise, it will be observed that the upper guard member 23 after passing through the cored opening 27 rests upon, and therefore, has supporting engagement with the top of this cross slide extension $15^x$. This supplements the supporting action of the lower guard members of the cross slide carriage, but without this support on the extension of the cross slide, the upper guard members are well supported and by reason of the supporting action of the lower guard members they are able to withstand shocks incident to blows accidentally delivered to the upper guard members in the use of the machine.

Figures 8, 9, 10, 11:
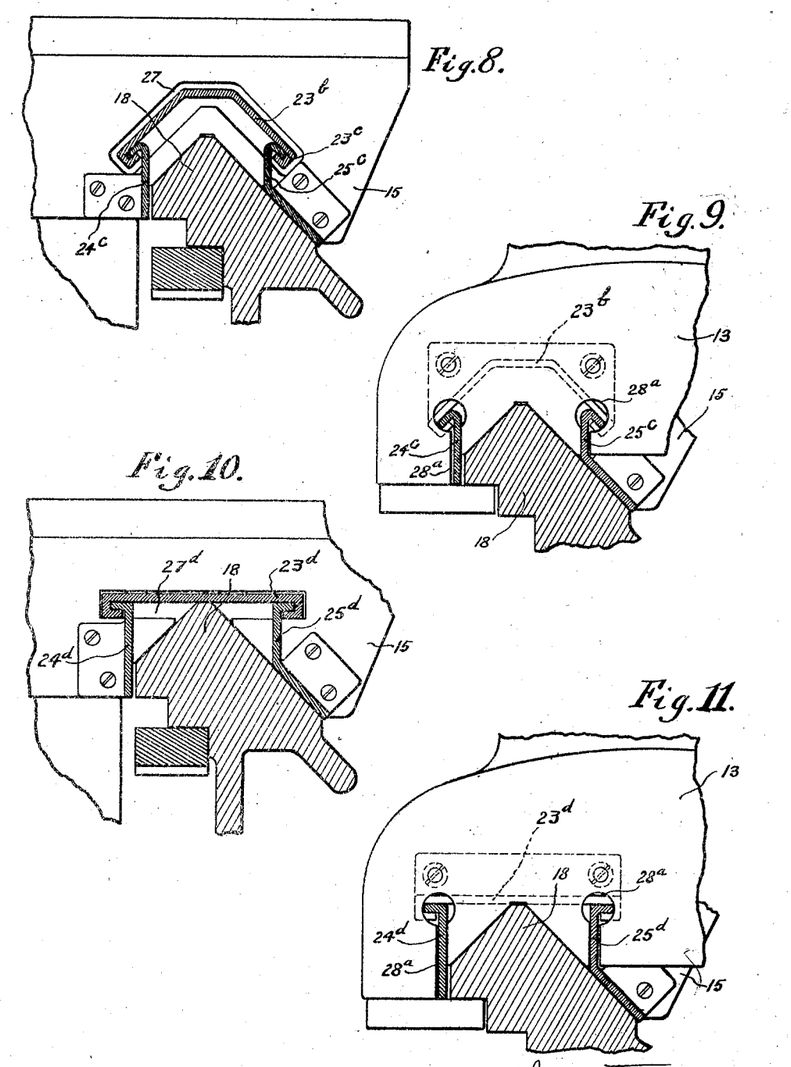
Fig. 8 is a view corresponding to Fig. 7, showing a further slight modification.
Fig. 9 is a view corresponding to Fig. 6 and taken at the rear end of the turret saddle, showing the same modification.
Figs. 10 and 11 are views corresponding to Figs. 8 and 9, showing a further slight modification.

In the construction already described, the upper guard members 23 and $23^a$ rest on the top edges of the lower guard members attached to the cross slide carriage, but in some instances it may be desirable to supplement this sliding contact by a more positive connection, as by forming one part in the form of a tongue and the other in the form of a groove or slot to receive the tongue. This modification in different forms is illustrated in Figs. 8 to 11. In Figs. 8 and 9 the upper guard member, designated $23^b$ is doubled inwardly upon itself, as illustrated at $23^c$ forming inwardly and upwardly facing grooves or slots, and the two lower guard members attached to the cross slide carriage, and here designated $24^e$ and $25^e$, have their edge portions bent laterally and downwardly, and these extend into said grooves or slots of the upper guard member, and have sliding engagement therein. With this construction a closer union is provided between the upper and lower guard members, and dust or the like is more effectively excluded, particularly as it prevents the separation or gapping of the parts for any cause, as by a blow from a heavy work piece or tool. A further advantage is that the guard members may be formed of thinner or lighter gauge material than in the construction first described, particularly as this arrangement provides a greater inherent stiffness in the several parts.

As already stated, it is not essential that the upper guard members be of inverted U or V shape. On the other hand, these guard members may be flat, or substantially flat, or otherwise shaped, and in Figs. 10 and 11 I have shown a construction wherein the upper guard members, here designated 23$^d$, are flat, the edges being interlocked with the lower guard members, here designated 24$^d$ and 25$^d$, in the manner illustrated in Figs. 10 and 11.

We prefer that the clearance opening in the cross slide carriage previously designated 27 to accommodate the forwardly projecting upper guard member of the turret slide be formed so as to leave a continuous or unbroken section of metal beneath the opening to engage the way, but this is not essential, and in Fig. 10 I have shown a modification in the form of this opening, the opening being here designated 27$^d$. The opening herein illustrated may be in the form of a milled slot, the bottom wall of which is not continuous. In such case the top of the way may project up into the slot and serve as a support for the middle portion of the upper guard member, as illustrated in this figure.

When the lower guard members are formed, as in Figs. 8 to 11, obviously the clearance slots provided in the turret saddle, and previously designated 28, must, of course, be shaped to accommodate the modified form or shape of the lower guard members. It is not necessary that the shape of the slots provided in the turret saddle correspond precisely to the shape of the lower guard members which extend through the turret saddle, as will be seen by reference to Figs. 9 and 11 where the slots, designated 28$^a$, have lower parallel portions to accommodate the lower parallel portions of the lower guard members, and have suitable enlargements which can be drilled or otherwise formed to accommodate the laterally or laterally and downwardly bent upper portions of the lower guard members.

Thus it will be seen that a way guard is provided for a way, over which two slides or members are adapted to travel, and that this way is as effectively protected as is the way over which only a single member is adapted to travel, and it will be seen that this is accomplished in this instance by the provision of guard members which are attached to both of the slides or traveling members, these guard members being telescopically arranged, and the guard member or members carried by each slide having clearance with the companion slide, and further that said guard members have supporting relation with respect to one another, and together form a housing which completely covers the working surfaces of the way, regardless of the positions of the sliding bodies on the ways with respect to one another and with respect to the head.

Figure 12:
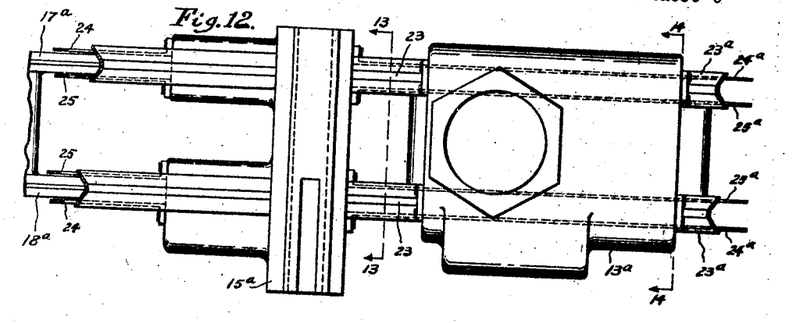
Fig. 12 is a plan view corresponding to Fig. 3, showing my invention applied to a lathe wherein two ways only are provided for the cross slide carriage and turret saddle, both ways being common to both sliding members.
Figure 13:
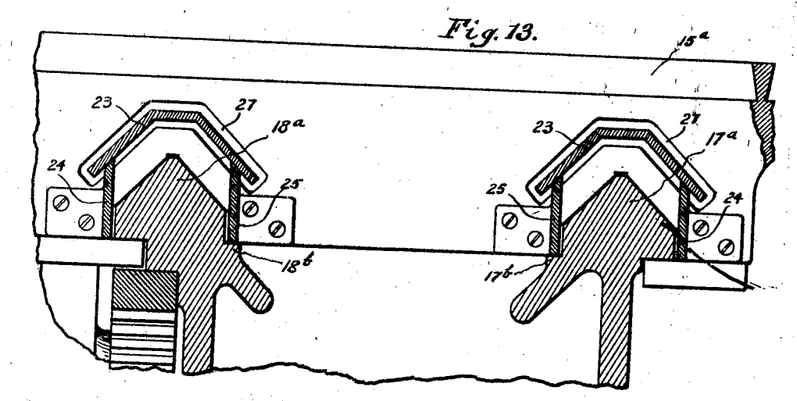
Fig. 13 is a cross-sectional view corresponding to Fig. 5 and taken substantially along the line 13—13 of Fig. 12, looking in the direction indicated by the arrows, the parts being shown on a slightly enlarged scale.
Figure 14:
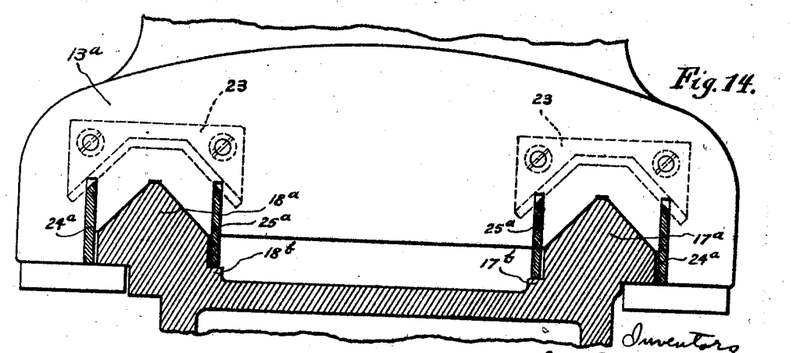
Fig. 14 is a similar sectional view taken substantially along the line 14—14 of Fig. 12, looking in the direction indicated by the arrows.

The lathe or machine tool described above, is provided with only one way common to both sliding members, but our invention is equally applicable to machines wherein the two or more sliding members are supported on two ways, instead of three; that is to say, wherein two ways are common to a plurality of sliding members, generally two in number, and in Figs. 12, 13 and 14 we have illustrated somewhat conventionally a turret lathe wherein the turret saddle, here designated 13$^a$, and the cross slide carriage 15$^a$, are both supported on two upper ways 17$^a$ and 18$^a$, both at the top of the bed. Of course, with such a construction, the lower way 19, of the lathe first described is unnecessary.

When the turret saddle and cross slide carriage are supported in this fashion, our improved way guards are applied to both ways, as it is applied to the single common way 18 of the construction first described. In thus applying our invention to both ways, any of the modifications previously described may be employed, but in Figs. 12, 13 and 14, for convenience, the form of the invention illustrated in Figs. 1 to 6 is utilized; that is to say, there is attached to the front end of the turret saddle, upper guard members 23 which project forwardly through the cross slide carriage 15$^a$ over both ways 17$^a$ and 18$^a$, and there is attached to the rear end of the turret saddle, upper guard members 23$^a$ which project rearwardly over both ways 17$^a$ and 18$^a$. Similarly, there are attached to the front side of the cross slide carriage two pairs of lower guard members 24 and 25, which project forwardly along the two ways 17$^a$ and 18$^a$ in supporting relation to the two upper guard members 23, and in similar fashion there are attached to the rear side of the cross slide carriage, two pairs of lower guard members 24$^a$ and 25$^a$ which extend through the clearances in the turret saddle beneath the upper guard members 23 and 23$^a$, as illustrated in the drawings.

As the inner sides of the two ways 17$^a$ and 18$^a$ are in this instance somewhat differently formed than the way 18, the long inner slant being dispensed with, the inner lower guard members may be shaped precisely like the outer lower guard members, and they may be given a bearing on shoulders 17$^b$ and 18$^b$ provided along the inner sides of the ways 17$^a$ and 18$^a$, as illustrated in Figs. 13 and 14, thus providing additional supports for these particular guard members.

It will be seen from the above that our invention is equally applicable to machines having either one or a plurality of ways common to two or more sliding members.

We do not desire to be confined to the precise details or arrangements shown, nor to the type of machine tool shown and described, but aim in our claims to cover all modifications which do not involve a departure from the spirit and scope of our invention as defined in the appended claims.

Having described our invention, we claim:

1. A machine tool having a bed with ways for a plurality of slidable members, one or more of said ways being common to said sliding members, and guard members extending over the common way or ways and protecting the working surfaces thereof without interfering with the movements of the sliding members, said guard members being in overlapping relation and one attached to one sliding member and another to another sliding member.

2. A machine tool having a plurality of ways and a plurality of sliding members movable toward and from each other along said ways, one or more of said ways being common to said members, and rigid guard members enclosing said common way or ways so as to protect the working surfaces thereof without interfering with the relative movements of the sliding members, said guard members being composed of relatively sliding parts carried by said sliding members.

3. A machine tool having a plurality of ways and a plurality of sliding members movable along the same, one or more of said ways being common to said members, and guard members attached to said sliding members and extending between them in overlapping relationship and serving to protect the working surfaces of said common way or ways without interfering with the relative movements of the sliding members.

4. A machine tool having a plurality of sliding members, a way over which said sliding members are adapted to travel, and a guard for said way composed of guard members attached to said sliding members and protecting the working surfaces of said way without interfering with the relative movements of the sliding members, each sliding member having a clearance for the guard member carried by the other sliding member.

5. A machine tool having a way and two sliding members adapted to travel thereover, and a guard for such way composed of relatively slidable parts and protecting the working surfaces of the way without interfering with the relative movements of the sliding members.

6. A machine tool having a way and two sliding members adapted to travel thereover, and a guard for such way composed of overlapping guard members attached to said sliding members.

7. In a machine tool, a way and two sliding members adapted to travel thereover, and a guard for said way composed of guard members attached to both sliding members and protecting the working surfaces of said way without interfering with the relative movements of the sliding members, each of the latter having an opening adapted to accommodate a guard member of the other sliding member.

8. In a machine tool, a way and two sliding members adapted to travel thereover, and a guard for said way composed of a plurality of relatively movable guard members attached to the sliding members, one in supporting relation to another.

9. In a machine tool, a way and two sliding members adapted to travel thereover, and a guard for said way composed of upper and lower guard members, one attached to one sliding member and another attached to another sliding member.

10. In a machine tool, a plurality of sliding members, a plurality of ways therefor, one or more of said ways being common to said sliding members, and a guard for said common way or ways composed of a plurality of relatively slidable guard members including upper and lower guard members.

11. In a machine tool, a plurality of sliding members, a plurality of ways therefor, at least one common to said sliding members, and a guard for said common way or ways, said guard being composed of a plurality of relatively slidable guard members including an upper guard member and two lower guard members, the upper guard member being attached to one sliding member, and the lower guard members being attached to another sliding member.

12. In a machine tool, a plurality of sliding members and ways therefor including one or more which are common to said sliding members, a guard for said common way or ways including a guard member attached to one sliding member and having a clearance in an adjacent sliding member, and cooperating guard members attached to the said adjacent sliding member and having clearance in the first named sliding member.

13. In a machine tool, a plurality of sliding members, a way over which said members are adapted to travel, and a guard for said way including a member attached to one of said sliding members and having a support on another of said sliding members.

14. In a machine tool, a plurality of sliding members, a way over which said members are adapted to travel, and a guard for said way composed of relatively slidable members including a guard member attached to one of said sliding members and having a support on said way.

15. In a machine tool, a plurality of sliding members, a way over which said members are adapted to travel, and a guard for protecting the working surfaces of said way, composed of a plurality of relatively movable guard members, one of said guard members being attached to one of the sliding members and having a support on another sliding member.

16. A machine tool having a plurality of sliding members, a way over which said members are adapted to travel toward and from each other, and a guard for said way composed of relatively movable guard members attached to said sliding members, part arranged above and overhanging other guard members.

In testimony whereof, we hereunto affix our signatures.

EDWARD P. BURRELL.
JOHN J. N. VAN HAMERSVELD.